(12) United States Patent
Kirtley et al.

(10) Patent No.: US 9,863,323 B2
(45) Date of Patent: Jan. 9, 2018

(54) TAPERED GAS TURBINE SEGMENT SEALS

(71) Applicant: General Electric Company, Schenectady, NY (US)

(72) Inventors: Kevin Richard Kirtley, Simpsonville, SC (US); Victor John Morgan, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 541 days.

(21) Appl. No.: 14/623,570

(22) Filed: Feb. 17, 2015

(65) Prior Publication Data

US 2016/0237912 A1 Aug. 18, 2016

(51) Int. Cl.
*F02C 7/28* (2006.01)
*F01D 11/00* (2006.01)
*F16J 15/02* (2006.01)

(52) U.S. Cl.
CPC ............. *F02C 7/28* (2013.01); *F01D 11/00* (2013.01); *F01D 11/001* (2013.01); *F01D 11/005* (2013.01); *F05D 2240/11* (2013.01); *F05D 2240/55* (2013.01); *F16J 15/02* (2013.01)

(58) Field of Classification Search
CPC .... F01D 11/00; F01D 11/005; F05C 2240/11; F05C 2240/55; F05C 2240/57; F05C 2240/59; F02C 7/28
See application file for complete search history.

(56) References Cited

U.S. PATENT DOCUMENTS

| | | | | |
|---|---|---|---|---|
| 3,728,041 A | * | 4/1973 | Bertelson | ............... F01D 9/042 277/643 |
| 4,279,424 A | * | 7/1981 | Zerlauth | ............... F01D 11/005 277/589 |
| 5,154,577 A | * | 10/1992 | Kellock | ............... F01D 11/005 277/641 |
| 6,893,214 B2 | | 5/2005 | Alford et al. | |
| 7,445,425 B2 | | 11/2008 | Ferra et al. | |
| 7,513,740 B1 | | 4/2009 | Hervy et al. | |

(Continued)

FOREIGN PATENT DOCUMENTS

| | | |
|---|---|---|
| DE | 102012100521 A1 | 7/2012 |
| EP | 2060745 A2 | 5/2009 |

(Continued)

OTHER PUBLICATIONS

European Search Report and Written Opinion issued in connection with corresponding EP Application No. 16154734.4 dated Jul. 28, 2016.

*Primary Examiner* — Nicholas L Foster
(74) *Attorney, Agent, or Firm* — Eversheds Sutherland (US) LLP

(57) ABSTRACT

The present application and the resultant patent provide improved gas turbine component sealing. In one example embodiment, a gas turbine segment seal assembly may include a first tapered segment seal with a first tapered portion having a first tapered surface and a first taper angle. The gas turbine segment seal assembly may include a second tapered segment seal with a second tapered portion having a second tapered surface and a second taper angle. The gas turbine segment seal assembly may include a seal pin positioned in between the first tapered segment seal and the second segment seal and adjacent to the first tapered surface and the second tapered surface.

11 Claims, 4 Drawing Sheets

(56) References Cited

U.S. PATENT DOCUMENTS

| | | | | |
|---|---|---|---|---|
| 8,075,255 B2* | 12/2011 | Morgan | ............... | F01D 11/005 277/614 |
| 8,157,511 B2* | 4/2012 | Pietrobon | ............. | F01D 11/005 277/641 |
| 8,753,073 B2* | 6/2014 | Albers | ................. | F01D 11/125 415/139 |
| 8,998,573 B2* | 4/2015 | Albers | ................. | F01D 11/005 415/139 |
| 9,534,500 B2* | 1/2017 | Bouchard | ............. | F01D 9/04 |
| 9,759,079 B2* | 9/2017 | Sippel | ................. | F01D 11/005 |
| 2010/0080699 A1* | 4/2010 | Pietrobon | ............. | F01D 11/005 415/220 |
| 2010/0187762 A1* | 7/2010 | Heinz-Schwarzmaier | ...... | F01D 11/005 277/312 |
| 2011/0318171 A1* | 12/2011 | Albers | ................. | F01D 11/125 415/173.1 |
| 2012/0107122 A1* | 5/2012 | Albers | ................. | F01D 11/005 416/179 |
| 2012/0189435 A1 | 7/2012 | Morgan et al. | | |
| 2012/0274034 A1* | 11/2012 | Bouchard | ............... | F01D 9/04 277/650 |
| 2014/0154062 A1 | 6/2014 | Weber et al. | | |
| 2014/0348642 A1 | 11/2014 | Weber et al. | | |
| 2015/0098808 A1* | 4/2015 | Morgan | ................. | F01D 9/041 415/173.3 |
| 2015/0118022 A1* | 4/2015 | Weber | ................... | F01D 11/005 415/116 |
| 2016/0061048 A1* | 3/2016 | Corcoran | ............... | F01D 11/006 416/171 |
| 2016/0348521 A1* | 12/2016 | Sippel | ................... | F01D 11/005 |
| 2017/0159479 A1* | 6/2017 | Dev | ...................... | F01D 11/006 |
| 2017/0254220 A1* | 9/2017 | Hillier | ................... | F01D 25/12 |
| 2017/0254271 A1* | 9/2017 | Hillier | ...................... | F02C 7/28 |
| 2017/0254272 A1* | 9/2017 | Hillier | ...................... | F02C 7/28 |

FOREIGN PATENT DOCUMENTS

| | | | | |
|---|---|---|---|---|
| EP | 2551562 A2 | 1/2013 | | |
| GB | 2240822 A | * 8/1991 | ............... | F02K 1/80 |

* cited by examiner

TAPERED GAS TURBINE SEGMENT SEALS

TECHNICAL FIELD

The present application and the resultant patent relate generally to gas turbine engines and more particularly relate to tapered gas turbine segment seals and the like for controlling leakage flow between components of a gas turbine engine.

BACKGROUND OF THE INVENTION

Generally described, turbo-machinery such as gas turbine engines and the like include a main gas flow path extending therethrough. Gas leakage, either out of the gas flow path or into the gas flow path, may lower overall gas turbine efficiency, increase fuel costs, and possibly increase emission levels. Secondary flows also may be used within the gas turbine engine to cool the various heated components. Specifically, cooling air may be extracted from the later stages of the compressor for use in cooling the heated components and for purging gaps and cavities between adjacent components. For example, segment seals may be placed at junctions between turbine components such as stators and the like to limit air leakage. Segment seals, however, may be spaced apart, resulting in leakage flow escaping through gaps in between the segment seals. Leakage flow may result in reduced efficiency of the gas turbine.

There is thus a desire for improved segment seals for use with gas turbine components, such as stator components and other components of heavy duty gas turbine engines. Such segment seals may be configured to reduce or remove gaps between segment seals, resulting in reduced leakage flow therethrough, as well as increased overall efficiency and/or increased component lifetime.

SUMMARY OF THE INVENTION

The present application and the resultant patent provide a gas turbine seal assembly including a first tapered segment seal with a first tapered portion, a second tapered segment seal with a second tapered portion, and a seal pin positioned in between the first tapered segment seal and the second segment seal.

The present application and the resultant patent also provide a method of reducing a leakage flow in a gas turbine component. The method including the steps of positioning a first tapered segment seal in a first segment slot, positioning a second tapered segment seal in a second segment slot, and positioning a seal pin in between the first tapered segment seal and the second segment seal such that a leakage path between the first tapered segment seal and the second tapered segment seal is occluded. The method may include loading the seal pin with a pressure differential independent of the first tapered segment seal and the second tapered segment seal.

The present application and the resultant patent further provide a gas turbine segment seal assembly including a first tapered segment seal having a first tapered portion with a first tapered surface having a first taper angle, and a second tapered segment seal having a second tapered portion with a second tapered surface having a second taper angle. The gas turbine seal assembly may include a seal pin positioned in between the first tapered segment seal and the second segment seal and adjacent to the first tapered surface and the second tapered surface.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
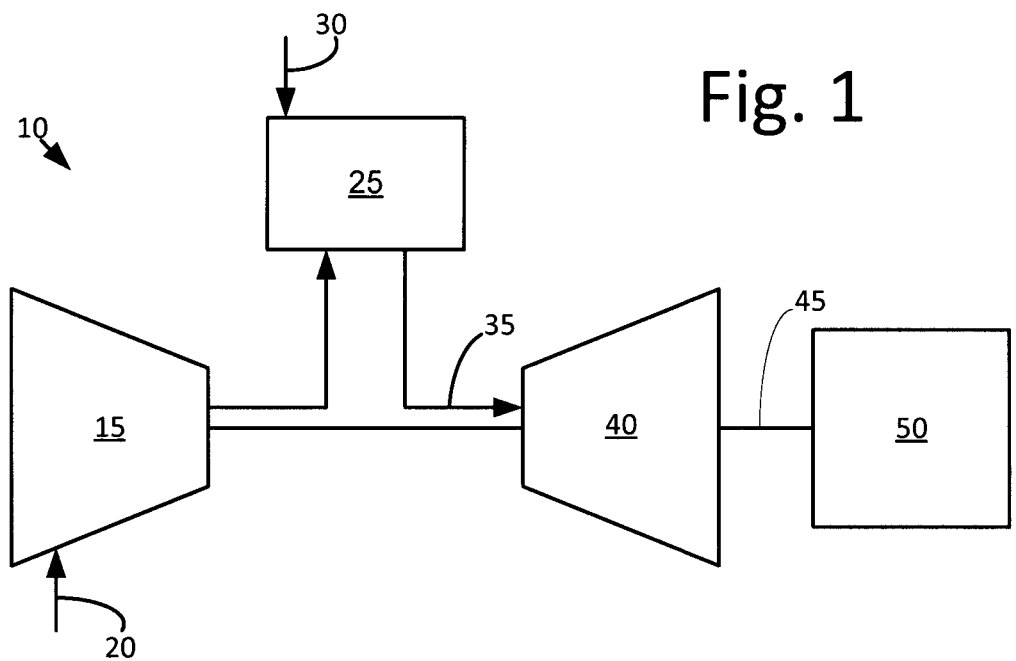
FIG. 1 is a schematic view of a gas turbine engine showing a compressor, combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations of the gas turbine engine 10 may be used, and the gas turbine engine 10 may include other components.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
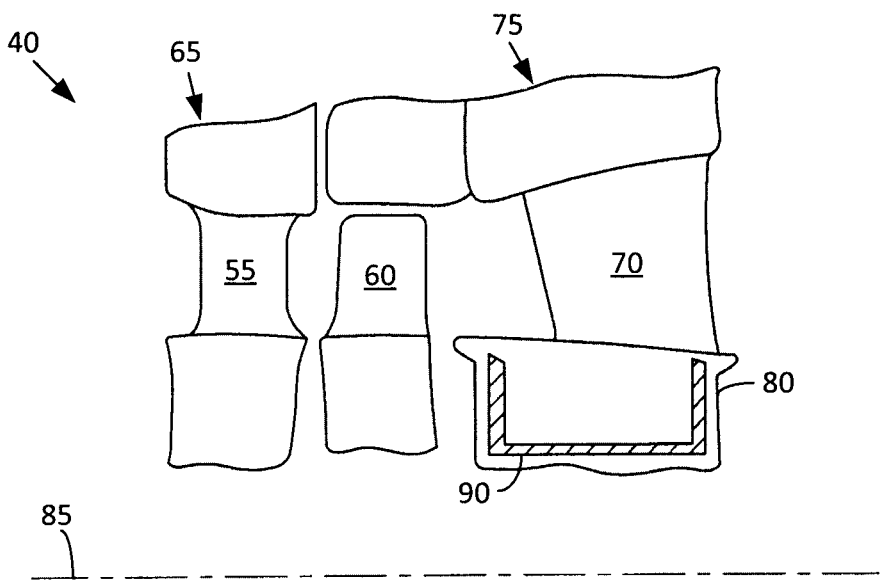
FIG. 2 is a partial side view of a turbine showing a number of components positioned along a hot gas path.

FIG. 2 shows a portion of the turbine 40. Generally described, the turbine 40 may include a first stage nozzle 55 and a first stage bucket 60 of a first stage 65. Also shown is a second stage nozzle 70 of a second stage 75. Any number of stages may be used herein. The nozzles 55, 70 may be positioned on a diaphragm 80. Any number of nozzles 70 and diaphragms 80 may be positioned circumferentially about an axis 85. A seal 90 may be positioned between each pair of adjacent diaphragms 80. The seals 90 may be used between adjacent diaphragms 80 or other turbine components so as to prevent the leakage of the cooling air flows 20 from the compressor 15 or elsewhere therethrough. As described above, the seals 90 may have different configurations. Other types of sealing mechanisms also may be used. Other components and other configurations may be used herein.

Figure 3:
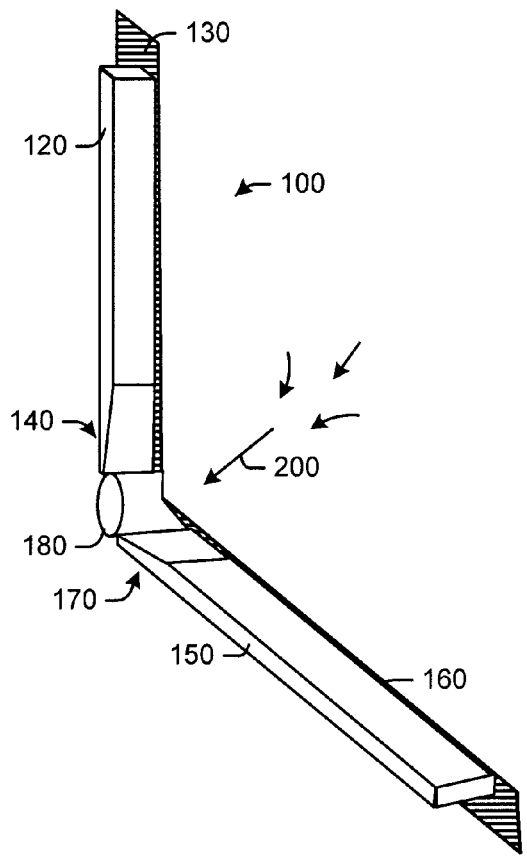
FIG. 3 is a partial perspective view of one embodiment of a tapered segment seal assembly positioned between adjacent turbine components.
Figure 4:
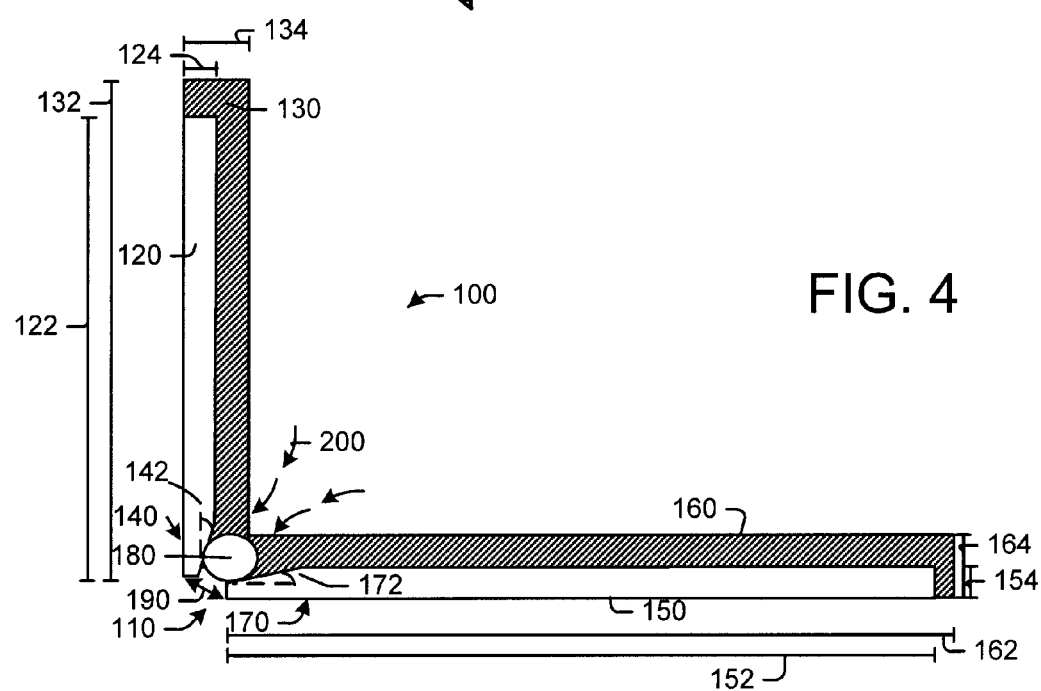
FIG. 4 is a partial front view of the tapered segment seal assembly of FIG. 3.
Figure 5:
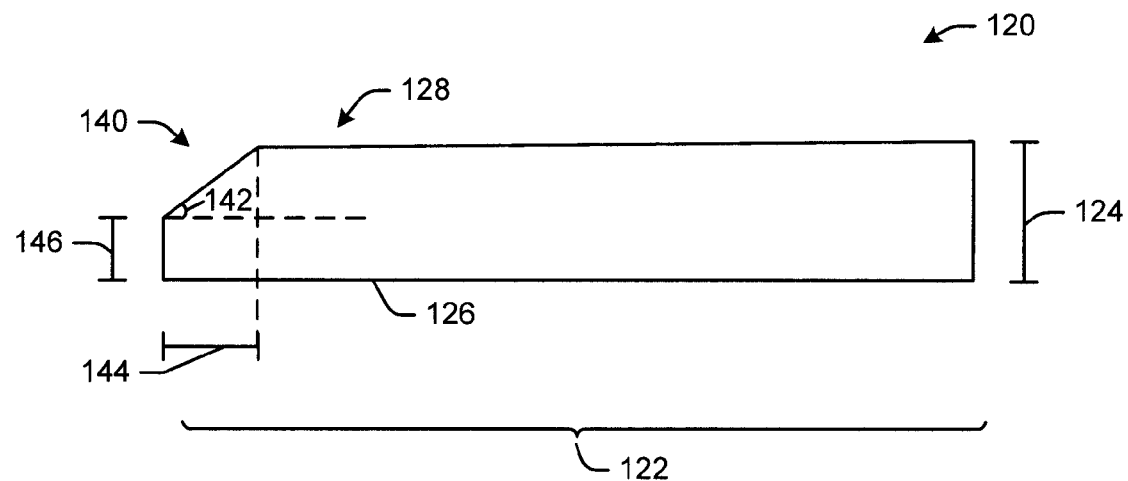
FIG. 5 is a side view of one embodiment of a tapered segment seal.

Referring now to FIGS. 3-5, a tapered segment seal assembly 100 positioned at a gas turbine component as described herein is depicted in perspective view in FIG. 3 and front view in FIG. 4. The tapered segment seal assembly 100 may be positioned at any suitable location at the gas turbine component, such as the position of the seal 90 positioned in between adjacent diaphragms 80 in FIG. 2. The tapered seal assembly 100 may be configured to block, obstruct, or occlude a leakage path 200 of leakage flow passing therethrough. The tapered segment seal assembly includes a first tapered segment seal 120, a second tapered segment seal 150, and a seal pin 180. The first tapered segment seal 120 may be positioned in a first segment seal slot 130 and the second tapered segment seal 150 may be positioned in a second segment seal slot 160. The first segment seal slot 130 may be substantially perpendicular to, or perpendicular to, the second segment seal slot 160, but any angle may be used. Each of the first tapered segment seal 120 and the second tapered segment seal 150 may be selected from a family of sealing elements. Examples of families of sealing elements include metal sealing elements, cloth-layer sealing elements, foil-layer sealing elements, or other families of sealing elements. The first tapered segment seal 120 may be selected from the same, or from a different, family of sealing elements than the second tapered segment seal 150.

The first tapered segment seal 120 may be positioned entirely or partially within the first segment seal slot 130. As is shown, the first tapered segment seal 120 may be aligned with one or more edges of the first segment seal slot 130. Similarly, the second tapered segment seal 150 may be positioned within the second segment seal slot 160 and may be aligned with one or more edges of the second segment seal slot 160. In some embodiments, the first and second tapered segment seals 120, 150 may be recessed in the respective first and second segment seal slots 130, 160 to provide sealing of cooling flow or other gas from escaping through the leakage path 200 and/or passing between components.

In FIG. 4, the first tapered segment seal 120 may have a first length 122 and a first width 124. The first segment seal slot 130 may have a first slot length 132 and a first slot width 134. In the illustrated embodiment, the first length 122 and the first width 124 of the first tapered segment seal 120 may be less than the first slot length 132 and the first slot width 134, respectively. Similarly, the second tapered segment seal 150 may have a second length 152 and a second width 154. The second segment seal slot 160 may have a second slot length 162 and a second slot width 164. The second slot length 162 may be greater than the second length 152 and the second slot width 164 may be greater than the second length 154. In other embodiments, the first length 122 and/or the first width 124 may be equal to the first slot length 132 and/or the first slot width 134, respectively. The second length 152 may be equal to the second slot length 162 and/or the second width 154 may be equal to the second slot width 164. In other embodiments, the first tapered segment seal 120 and/or the second tapered segment seal 150 may be configured or sized to fit within the first segment seal 130 and the second segment seal 160, respectively, for example with a friction fit.

The first segment seal 120 may include a first tapered portion 140, where the first segment seal 120 has a tapered configuration. A tapered configuration may be indicated by a gradual thinning or narrowing of the tapered segment seal towards an end of the segment seal. For example, in FIGS. 3 and 4, the first segment seal 120 may include the first tapered portion 140 wherein a surface, such as an inner gas path facing surface of the first segment seal 120 may gradually narrow towards an end of the first segment seal 120. The first tapered segment seal 120 may taper at the first tapered portion 140 by gradually reducing in overall thickness towards an end of the first tapered portion 140 adjacent to the seal pin 180. The taper of the first tapered portion 140 may be indicated by a first taper angle 142, representing the angle of taper towards the end of the first tapered portion 140 of the first tapered segment seal 120. In FIG. 5, the first tapered segment seal 120 is illustrated in detail. The first tapered portion 140 may have a first taper length 144 and a first taper height 146. In some embodiments, the first tapered portion 140 may extend from an upper surface 128 to a lower surface 126, such that the first tapered portion 140 does not have a taper height. The first taper angle 142 may be determined based on a diameter of the seal pin 180, for example. The second tapered segment seal 150 may have a similar configuration.

Referring again to FIGS. 3 and 4, the second tapered segment seal 150 may include a second tapered portion 170. The second tapered portion 170 may be in a tapered configuration such that an overall thickness of the second tapered segment seal 150 gradually thins or narrows towards an end of the second tapered segment seal 150. The taper of the second tapered portion 170 may be indicated by a second taper angle 172. The second taper angle 172 may be equal to or different than the first taper angle 142 of the first tapered segment seal 120. The first tapered portion 140 of the first tapered segment seal 120 may be positioned adjacent or perpendicular to the second tapered portion 170 of the second tapered segment seal 150. In some embodiments, the first tapered portion 140 and the second tapered portion 170 may contact each other. A gap 190 may be formed between the respective tapered portions 140, 170 at which the seal pin may be fixed or otherwise positioned. The first tapered portion 140 and the second tapered portion 170 may be positioned to block leakage path 200, which may be a location where gas flow 200 may attempt to escape from the gas turbine component. The second tapered segment seal 150 may be identical to, or a mirror image of the first tapered segment seal 120 in some embodiments. The second tapered segment seal 150 may have a different configuration.

Figure 6:
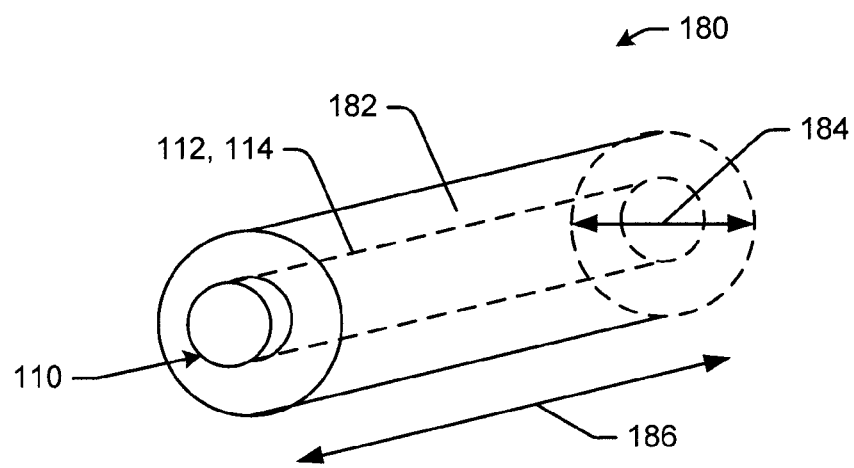
FIG. 6 is a perspective view of one embodiment of a seal pin.

Referring to FIGS. 3-4 and 6, the seal pin 180 may be positioned to occlude the gap 190 between the first tapered segment seal 120 and the second tapered segment seal 150 thereby reducing leakage. The seal pin 180 may be retained in position by an axle 110 positioned in opposite ends of the seal pin 180 that slide in a slot groove, or via another method. For example, as shown in FIG. 6, the seal pin 180 may be retained via a dowel 112 position in opposite ends of the seal pin 180, or in some embodiments extending through or partially through the seal pin 180. The first tapered portion 140 and the second tapered portion 170 may allow the seal pin 180 to load on the first and second tapered portions 140, 170 and may provide sufficient freedom for the first and second tapered segment seals 120, 150 to load independently. The seal pin 180 may have a cylindrical or substantially cylindrical configuration, or a rectangular, block-like, or other configuration, and may be configured to be positioned to block the leakage path 200 in between the first tapered portion 140 and the second tapered portion 170 of the first tapered segment seal 120 and the second tapered segment seal 150. The seal pin 180 may be in contact with both the first tapered portion 140 and the second tapered portion 170. As is shown in FIG. 6, the seal pin 180 may have a diameter 184 or height such that an outer surface 182 of the seal pin 180 is wedged against the first tapered portion 140 and the second tapered portion 170. The seal pin 180 may have a length or depth 186 substantially equal to, or equal to, a depth of the first or second tapered segment seals 120, 150. The seal pin 180 may be configured to be fixed within the gap 190 formed in between the first tapered portion 140 and the second tapered portion 170. In some embodiments, the seal pin 180 may be positioned such that the first and/or second tapered portions 140, 170 are in close proximity to the seal pin 180 instead of in contact with the seal pin 180.

The seal pin 180 may be retained by any number of methods, such as with an axle in the ends of the seal pin 180 that slides in a slot groove, or larger diameter flanges following the sides of sealing elements 140, 150. The seal pin 180 may be formed from a suitable material, such as a high temperature capable material that minimizes foreign object damage to the gas turbine component or the gas turbine in general. In one example, a ceramic metal composite may be used to form the seal pin 180.

As the tapered segment seal assembly 100 loads under a pressure differential when the gas turbine component is active, each of the first segment seal 120 and the second segment seal 150 can load independently in the respective first and second segment seal slots 130, 160. Loading of the seal pin 180 under the pressure differential may also enable loading of the opposite segment seal end gap. The seal pin 180 may load independently on the tapered faces of the first and second tapered portions 140, 170 of the first and second tapered segment seals 120, 150. As a result, the tapered segment seal assembly 112 may form a complete seal.

Figure 7:
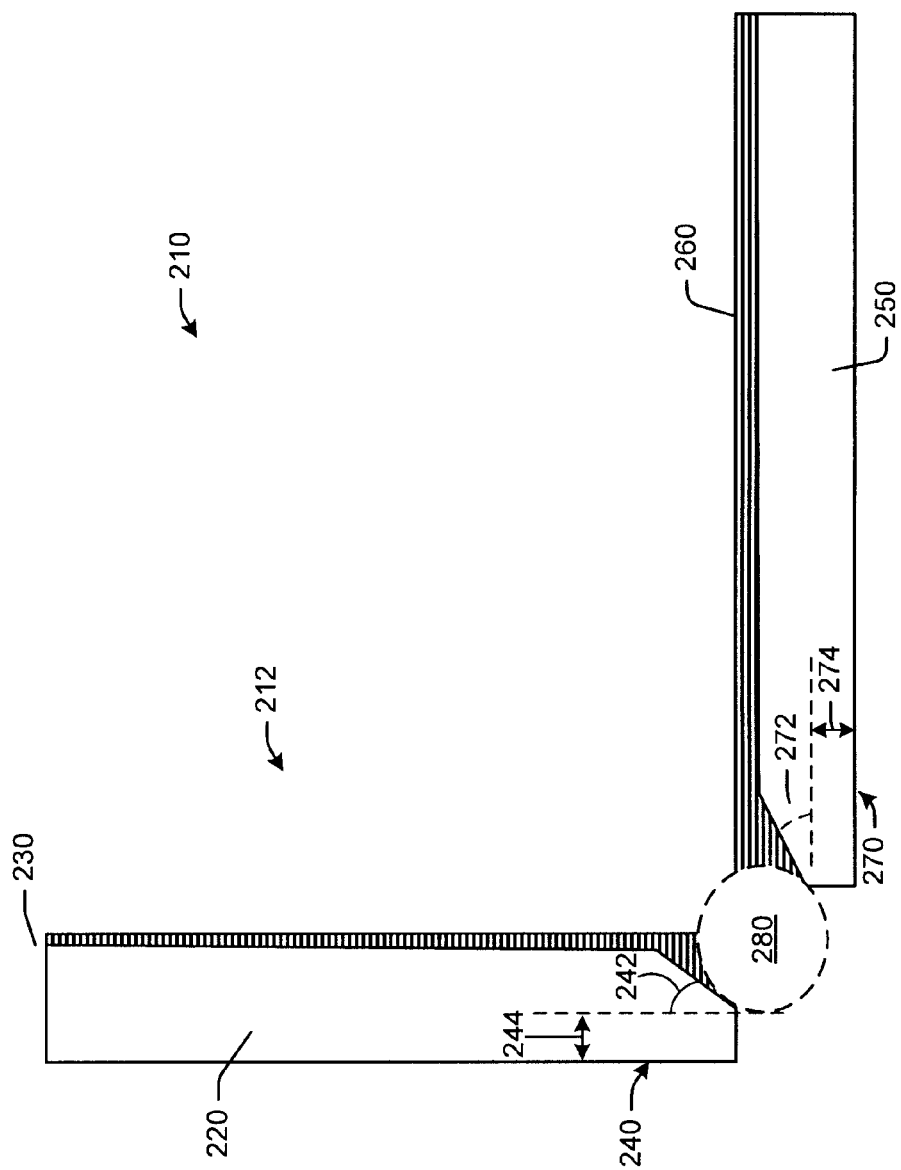
FIG. 7 is a partial front view of one embodiment of another embodiment of a tapered segment seal assembly positioned between adjacent turbine components.

Referring now to FIG. 7, another embodiment of a tapered segment seal assembly 212 is illustrated. A gas turbine component 210 may include a first vertical segment seal slot 230 and a second horizontal segment seal slot 260. A first vertical tapered segment seal 220 may be positioned in a friction fit in the vertical segment seal slot 230 and a second horizontal tapered segment seal 250 may be positioned in the horizontal segment seal slot 260 in a friction fit. In the embodiment of FIG. 7, the vertical tapered segment seal 220 may have a first tapered portion 240 with a first taper angle 242 and first taper height 244. The horizontal tapered segment seal 250 may have a second tapered portion 270 with a second taper angle 272 and second taper height 274 that is different than the first taper angle 242. The first tapered portion 240 may not be in contact with the second tapered portion 270. The first taper height 244 may be the same or different than the second taper height 274. The tapered segment seal assembly 212 may include a seal pin 280 configured to occlude a leakage path between the vertical and horizontal tapered segment seals 220, 260. The seal pin 280 may be positioned to occlude the gap between the vertical tapered segment seal 220 and the horizontal tapered segment seal 260 thereby reducing leakage. The seal pin 280 may be configured to fit between the first and second tapered portions 240, 270 of the vertical and horizontal tapered segment seals 220, 250.

The tapered segment seals described herein thus provide improved systems and methods for improved gas turbine component sealing. As described above, as the tapered segment seals load under a pressure differential, each tapered segment seal may load independently in the respective seal slot, and the seal pin may load independently on the tapered portions of the segment seals, resulting in a more complete seal.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine segment seal assembly, comprising:
a first tapered segment seal comprising a first tapered portion with a first tapered surface having a first taper angle, the first tapered segment seal being received in a first segment seal slot;
a second tapered segment seal comprising a second tapered portion with a second tapered surface having a second taper angle, the second tapered segment seal being received in a second segment seal slot; and
a substantially cylindrical seal pin positioned in between the first tapered segment seal and the second tapered segment seal, such that the seal pin is in contact with the first tapered surface and the second tapered surface and occludes a leakage path between the first tapered segment seal and the second tapered segment seal,
wherein the first tapered seal segment extends primarily in a first direction, the second tapered seal segment extends primarily in a second direction, and the first direction is angled with respect to the second direction.

2. The gas turbine segment seal assembly of claim 1, wherein the first taper angle is different than the second taper angle.

3. The gas turbine segment seal assembly of claim 1, wherein the first tapered segment seal is positioned substantially perpendicular to the second tapered segment seal.

4. The gas turbine segment seal assembly of claim 1, wherein the seal pin is retained by an axle positioned in opposite ends of the seal pin that slide in a slot groove.

5. The gas turbine segment seal assembly of claim 1, wherein the seal pin comprises a ceramic metal composite.

6. The gas turbine segment seal assembly of claim 1, wherein the first tapered segment seal loads under a pressure differential independent of the second tapered segment seal.

7. The gas turbine segment seal assembly of claim 1, wherein the first tapered segment seal loads under a pressure differential independent of the seal pin.

8. The gas turbine segment seal assembly of claim 1, wherein an opposite seal end of the first tapered segment seal is loaded by the seal pin.

9. The gas turbine segment seal assembly of claim 1, wherein the second tapered segment seal loads under a pressure differential independent of the seal pin.

10. The gas turbine segment seal assembly of claim 1, wherein each of the first tapered segment seal, the second tapered segment seal, and the seal pin load under a pressure differential independent of each other.

11. A method of reducing leakage flow in a gas turbine component, the method comprising:
positioning a first tapered segment seal comprising a first tapered portion with a first tapered surface having a first taper angle in a first segment slot;

positioning a second tapered segment seal with a second tapered surface having a second taper angle in a second segment slot;
positioning a substantially cylindrical seal pin in between the first tapered segment seal and the second segment seal such that the seal pin is in contact with the first tapered surface and the second tapered surface; and
loading the seal pin with a pressure differential independent of the first tapered segment seal and the second tapered segment seal such that a leakage path between the first tapered segment seal and the second tapered segment seal is occluded,
wherein the first tapered seal segment is substantially flat and extends primarily in a first direction, the second tapered seal segment is substantially flat and extends primarily in a second direction, and the first direction is angled with respect to the second direction.

* * * * *